United States Patent [19]

Fukutake et al.

[11] Patent Number: 4,754,860

[45] Date of Patent: Jul. 5, 1988

[54] PULL RELEASE CLUTCH

[75] Inventors: Heiji Fukutake; Kazuhiko Yoneda, both of Neyagawa, Japan

[73] Assignee: Kabushiki Kaisha Daikin Seisakusho, Osaka, Japan

[21] Appl. No.: 18,560

[22] Filed: Feb. 25, 1987

[30] Foreign Application Priority Data

Feb. 26, 1986 [JP] Japan .................................. 61-40633

[51] Int. Cl.$^4$ ........................ F16D 13/56; F16D 13/75
[52] U.S. Cl. ............... 192/70.25; 192/70.27; 192/70.3; 192/89 B; 192/111 B
[58] Field of Search ................ 192/70.25, 70.27, 89 B, 192/111 B, 70.21, 70.3, 99 A

[56] References Cited

U.S. PATENT DOCUMENTS

| | | | |
|---|---|---|---|
| 3,212,612 | 10/1965 | Sink | 192/111 B X |
| 3,489,256 | 1/1970 | Binder et al. | 192/89 B X |
| 3,712,435 | 1/1973 | Kraus | 192/70.27 |
| 4,086,995 | 5/1978 | Spokas | 192/111 B |
| 4,285,424 | 8/1981 | Sink et al. | 192/111 B |

FOREIGN PATENT DOCUMENTS 3419833 11/1985 Fed. Rep. of Germany .... 192/89 B

Primary Examiner—Leslie A. Braun
Assistant Examiner—Richard M. Lorence
Attorney, Agent, or Firm—Armstrong, Nikaido, Marmelstein & Kubovcik

[57] ABSTRACT

A pull-type clutch comprises a generally disc-shaped spring member disposed between a retainer axially shiftable in integral relation with a release bearing and a clutch cover, the spring member being supported at its circumferential edge portion by a holder portion provided on the inner periphery of the clutch cover, the inner periphery portion of the spring member being held in pressure contact with the retainer, levers disposed between the retainer and the pressure plate so that the load of the spring member acting on the retainer is magnified for transmission at a specified lever ratio between individual fulcrums of each of the levers.

5 Claims, 4 Drawing Sheets

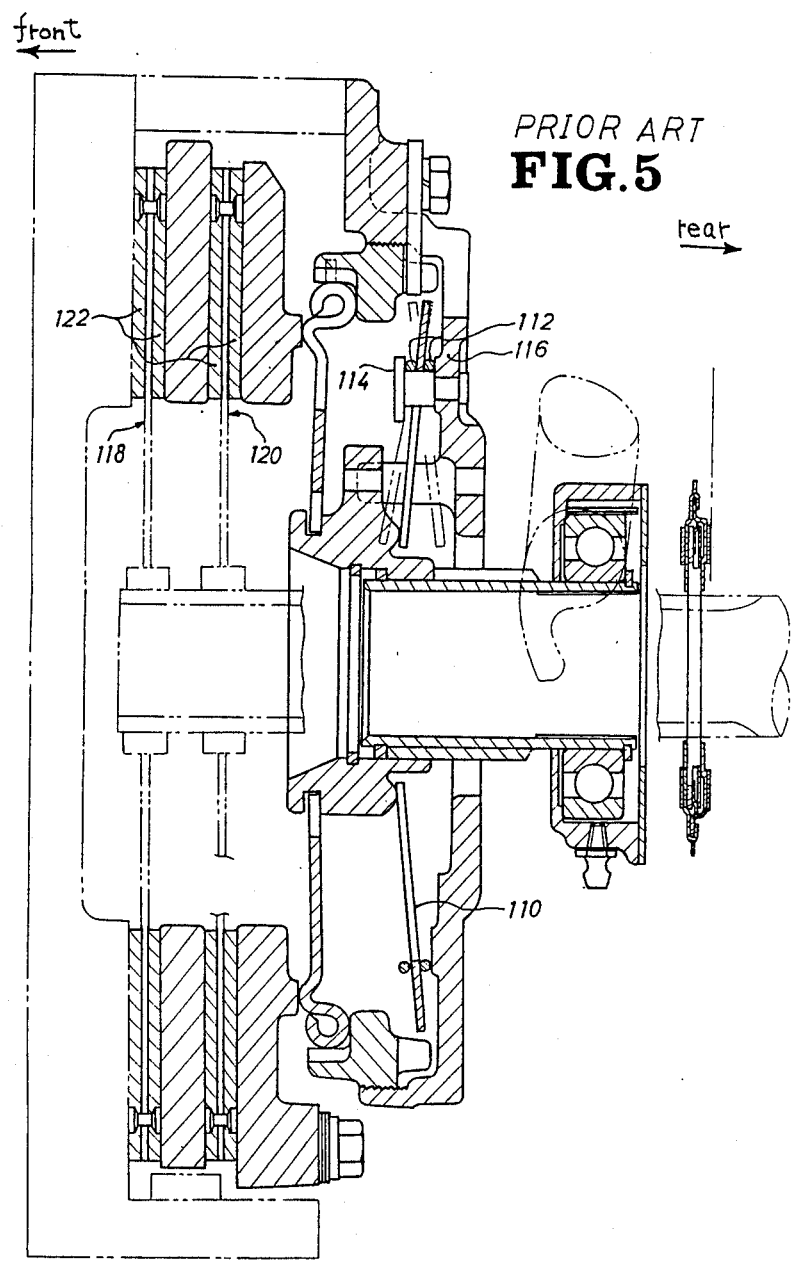

PULL RELEASE CLUTCH

BACKGROUND OF THE INVENTION

1. (Industrial Useful Field)

This invention relates to a clutch of the so-called pull type which performs release operation by pulling a release bearing toward a speed change gear by means of a release lever connected to a clutch pedal.

2. (Prior Art)

In a typical prior-art arrangement of this sort, as FIG. 4 shows, an inclined coil spring 100 is employed as a load generating member which acts on a retainer 102 to cause it to transmit the biasing force of the spring 100 to a pressure plate 106 through a lever 104 so that the pressure plate 106 is pressed against a clutch disk 108 (Japanese Patent Publication No. 46-15046).

However, such arrangement has a drawback that the biasing force of the coil spring 100 causes the pedal effort to increase as the stroke of the clutch pedal becomes greater, so that the pedal effort is increased during clutch release operation.

Another problem is that during high-speed operation the coil spring 100 is compressed under centrifugal force acting thereon, with the result that the spring force acting on the pressure plate 106 is reduced.

The present applicant developed a clutch which could eliminate these drawbacks of such pull-type clutch and already applied for a patent thereon in Japan (Japanese Patent Application No. 66-194158, filed on Sept. 2, 1985).

In this prior-art arrangement, as FIG. 5 shows, a diaphragm spring 110 is employed which is supported by a clutch cover 116 through wire rings 112 and stud pins 114. One difficulty with this clutch is that it is rather troublesome to dismantle the diaphragm spring 110 for replacement. Another difficulty is that a larger number of parts are involved.

3. (Object of the Invention)

Accordingly, it is the object of this invention to provide a pull-type clutch which permits easy dismantling and replacement of the diaphragm spring and which can minimize the number of parts required.

In order to accomplish this object, the clutch in accordance with the invention comprises clutch discs splinedly fitted on an input shaft of a speed change gear, a sleeve fitted over the outer periphery of the input shaft, a release bearing fixed to the sleeve at its end nearer to the speed change gear, a load transmission retainer fitted on the sleeve at its end nearer to a flywheel, the retainer being stopped against dislocation from the sleeve, a clutch cover for covering a pressure plate connected to the flywheel for pressing the clutch discs against the flywheel, a generally disc-shaped spring member disposed between the clutch cover and the retainer, the circumferential edge portion of the spring member being held in position by a holder portion provided on the inner periphery of the clutch cover, the inner peripheral portion of the spring member being pressed against said retainer at its end nearer to the speed change gear, levers disposed between the retainer and the pressure plate, the levers each being supported at a radially inner side fulcrum thereof by the retainer and biased at a radially outer side fulcrum thereof toward the clutch cover, the levers each being biased at an intermediate fulcrum thereof against the pressure plate, so that the load of the spring member acting on the retainer is magnified for transmission at a specified lever ratio between the individual fulcrums of each of the levers.

BRIEF DESCRIPTION OF THE INVENTION

FIG. 5 is a longitudinal section showing an arrangement previously developed by the present applicant.

DETAILED DESCRIPTION OF THE INVENTION

(Embodiment)

Figure 1:
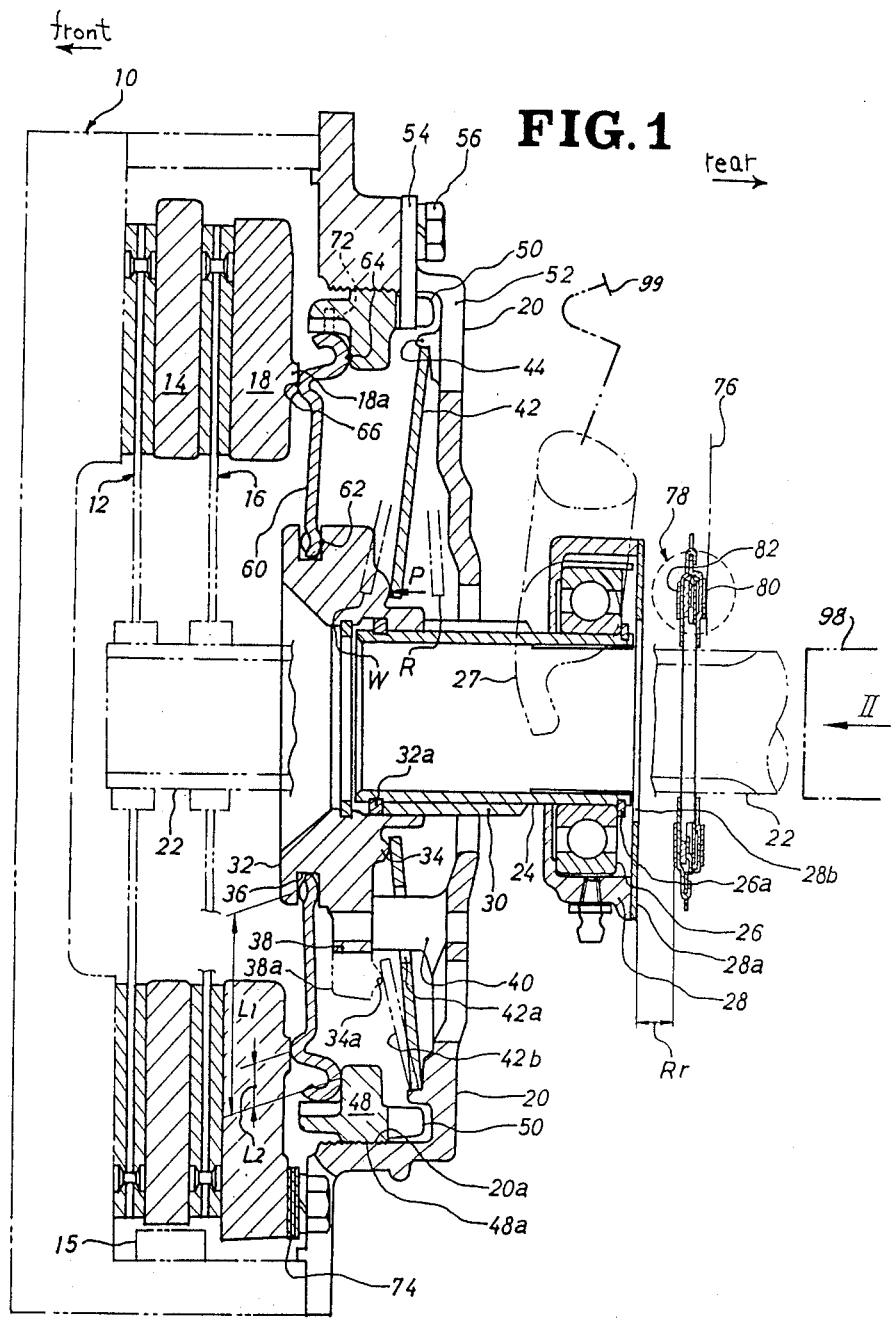
FIG. 1 is a longitudinal sectional view showing a clutch to which this invention is applied.

In FIG. 1 which shows in longitudinal section a clutch in accordance with the invention (and in the A-O-A section of FIG. 2), numeral 10 designates a flywheel, against the back side of which a clutch disc 12, an intermediate plate 14, and a clutch disc 16 are pressed in order of mention by a pressure plate 18. Radially outwardly of the intermediate plate 14 there is provided a pin 15 fixed to the flywheel 10 so that the flywheel 10 and the intermediate plate 14 are integrally rotatable by means of the pin 15.

A clutch cover 20 is provided behind the pressure plate 18 so as to cover the pressure plate 18, the clutch cover 20 being of a thick construction formed, for example, by casting. The clutch discs 12, 16 are splinedly fitted on an input shaft 22 of a speed change gear 98.

A cylindrical sleeve 24 is axially slidably fitted over a radially outer periphery of the input shaft 22. A release bearing 26 is fixed with a snap spring 26a to the sleeve at the rear end thereof, that is, at the change gear side end of the sleeve 24. A bearing holder 28 is disposed over the outer periphery of the release bearing 26 to cover the bearing 26, with an abutment plate 28a fixed to the rear end of the bearing holder 28. A through-hole 28b is open through the abutment plate 28a, the input shaft 22 passing through the through-hole 28b.

Numeral 27 designates a release lever connected to a clutch pedal 99. The release bearing 26 is axially moved by means of release lever 27.

External spline teeth 30 are formed on the sleeve 24 in other than that part thereof on which the release bearing 26 is fitted, a retainer 32 being in spline engagement with the external spline teeth 30. The retainer 32 is stopped by a snap ring 32a against dislocation, the forward slidable range of the retainer 32 being thereby restricted.

The retainer 32 is a member formed by casting, for example, and has a generally annular configuration. The retainer 32 has an abutment portion 34 formed on its rear-side surface and along the entire circumference thereof and also has an annular groove 36 formed in a portion adjacent its front-side end. On the outer periphery of the retainer 32 there are integrally formed therewith radially outwardly extending protrusions 38 at three locations, for example, in equispaced relation.

Engagement protrusions 40 are formed on the inner surface of the clutch cover 20 integrally therewith for engagement with the protrusions 38. As can be seen from FIG. 2, two engagement protrusions 40 are provided along opposite sides of each protrusion 38, the clutch cover 20 and retainer 32 being connected together by these engagement protrusions 40 for integral rotation.

Figure 2:
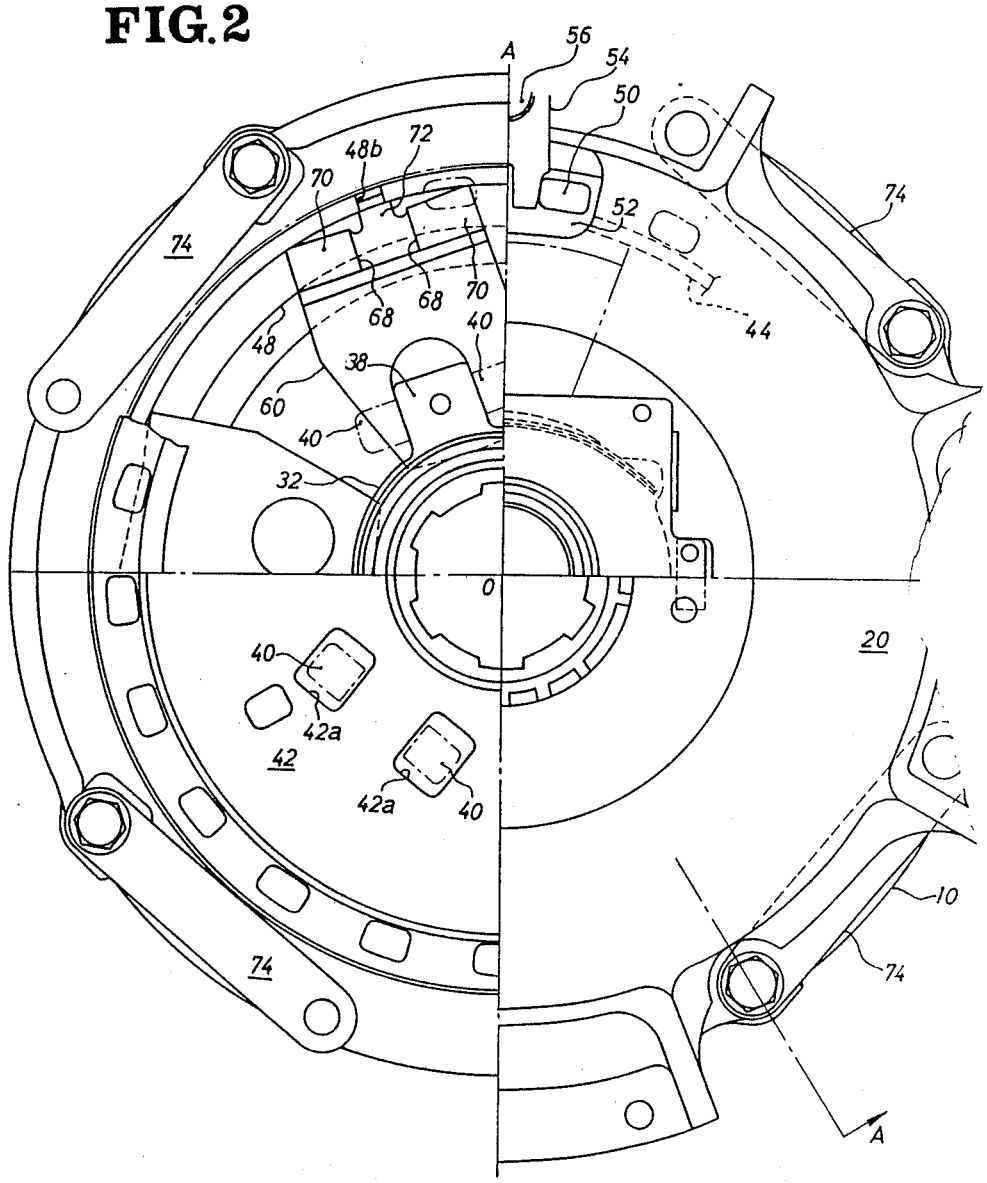
FIG. 2 is a view taken in the direction of the arrow II in FIG. 1.

A generally disc-shaped cone spring 42 (spring member) is provided between the clutch cover 20 and the protrusions 38 as FIG. 1 shows. An outer peripheral portion of the cone spring 42 is supported on the clutch cover 20 by a protrusion 44 of the clutch cover 20. This protrusion 44, as FIG. 2 shows, is formed in an annular pattern along nearly the whole of the radially outer periphery, except an opening 52 defined therein, of the clutch cover 20.

The inner periphery of the cone spring 42 is in pressure contact with the abutment portion 34 of the retainer 32. The cone spring 42, at each of its portions corresponding to the engagement protrusions 40, has a square aperture 42a (FIG. 2) formed therein to allow the corresponding engagement protrusions 40 to extend therethrough.

On the inner periphery of the clutch cover 20 at a location radially outward of the cone spring 42, as FIG. 1 shows, there is formed a threaded portion 20a, with which a threaded portion 48 of an adjuster ring 48 is in engagement, the adjuster ring 48 having a generally annular configuration.

The adjuster ring 48 has protrusions 50 formed on the back surface thereof at 24 locations, for example, and in circumferentially equispaced relation. The protrusions 50 are located along the radially outer periphery of the adjuster ring 48.

The clutch cover 20 has apertures 52 formed therein correspondingly to the protrusions 50, with a lock plate 54 fixed to each aperture 52 by a bolt 56. The lower end of each lock plate 54, as shown, is fitted on the corresponding protrusion 50, the adjuster ring 48 and the clutch cover 20 being thereby integrally connected together in such a way that the adjuster ring 48 is axially adjustable in position.

Levers 60 for release control are disposed between the pressure plate 18 and the retainer 32 at circumferentially equispaced six locations. An inner-side fulcrum 62 of each lever 60 is fitted in the annular groove 36 and an outer-side fulcrum 64 thereof is pressed against the front side of the adjuster ring 48, an intermediate fulcrum 66 being pressed against a fulcrum land 18a of the pressure plate 18. The lever ratio between these fulcrums 62, 64, 66, inner-side, outer-side, and intermediate, is set at L1:L2.

Each of the levers 60 is made of sheet metal, for example, in such a way that, as FIG. 2 shows, two cutting plane lines 68 are cut in a radially outer portion of the lever 60 so that outer pieces 70 defined by said lines 68 are bent to form the outer-side fulcrum 64 and intermediate fulcrum 66 (FIG. 1), while a median piece 72 formed between the outer pieces 70 and extending radially outward is allowed to extend into a recess 48b formed in the adjuster ring 48.

Strap plates 74 of a known type which extend in the circumferential direction are disposed between the outer peripheral portion of the pressure plate 18 and the clutch cover 20 and at four circumferentially equispaced locations.

Further, in FIG. 1, an inertia brake 78 is interposed between the abutment plate 28a and a speed change gear-side end 76, the brake 78 being splinedly fitted on the input shaft 22. The inertia brake 78 has at both sides thereof facings 80 and 82, with a release allowance Rr provided between the facing 82 and the abutment plate 28a.

(Function of the Invention)

Nextly, function of the above described embodiment will be explained. In this embodiment, the cone spring 42 is supported by the protrusion 44 of the clutch cover 20 and, therefore, the wire ring 112 and stud pin 114 in the prior-art arrangement of FIG. 5 are unnecessary. This means that the number of parts involved is smaller in the embodiment of the invention.

At the time of setting in an initial state as shown by solid line in FIG. 1, the biasing force P of the cone spring 42 presses the abutment portion 34 of the retainer 32 forward. This biasing force P is transmitted through the inner-side fulcrum 62 of the annular groove 36 to lever 60, whereupon the force P is magnified at the lever ratio of L1 : L2 to about three times as much as the force, for example, for transmission through the intermediate fulcrum 66 to the fulcrum land 18a for pressing the clutch discs 12, 16.

In this initial state the cone spring 42 is held in a generally flat position and, therefore, even in the case of high speed operation the cone spring 42 is little affected by any centrifugal force acting thereon, there being no possibility of the pressing force on the clutch discs 12, 16 being reduced by the influence of the centrifugal force.

As the clutch discs 12, 16 are worn away in the course of long-term use thereof, the pressure plate 18 shifts forward and the retainer 32 also shifts in the like manner. When such wear occurs, the cone spring 42 takes position W as shown by two-dot chain line in FIG. 1. In this state, the radially outer portion of each lever 60 assumes a backwardly tilted position; so, the lock plate 54 is removed and then the adjuster ring 48 is screwed forward to maintain the lever in position.

Figure 3:
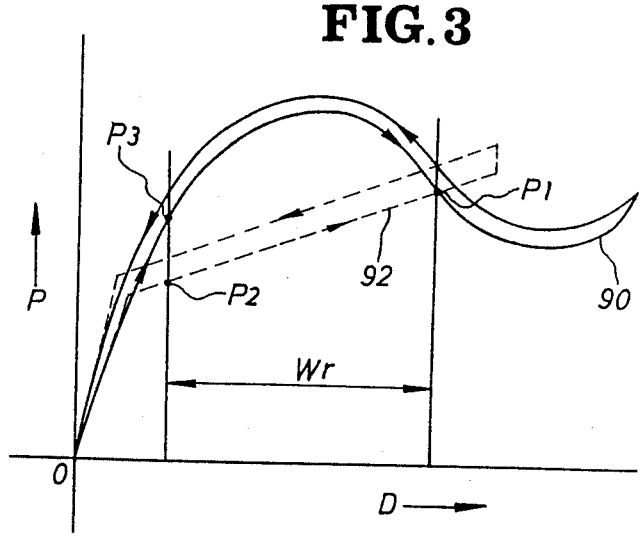
FIG. 3 is a graph showing the relationship between biasing force of a cone spring and deformation.
Figure 4:
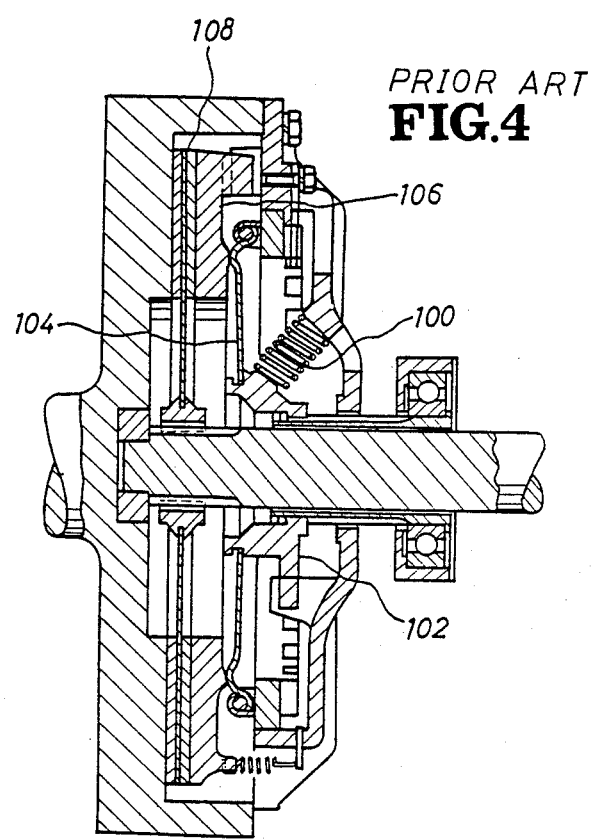
FIG. 4 is a longitudinal section showing a conventional arrangement.

Now, spring characteristics of the cone spring 42, as may be seen from FIG. 3 which shows the relationship between deformation D and spring force P, are such that they show an upward convex pattern within the scope of a wearing allowance Wr corresponding to the quantity of wear of the clutch discs 12, 16; therefore, the spring force P from the cone spring 42 is greater than the level of spring characteristics 92 of the coil spring 100 in the prior-art arrangement (FIG. 4), and thus the pressing force of the pressure plate 18 against the clutch discs 12, 16 is greater than that in the case of the prior-art arrangement.

In the case of characteristics 92, as the clutch discs 12, 16 are worn away, the spring force P tends to decrease from setting load P1 to wearing load P2, whereas in the case of characteristics 90 such decrease is very limited, that is, from setting load P1 to wearing load P3 as shown. In other words, according to the arrangement of the invention, load generation in the case of the clutch discs 12, 16 being worn away, or the so-called wearing load is greater than that conventionally obtainable. In addition, by virtue of aforesaid characteristics 90, the releasing force required for a releasing operation is reduced and accordingly the required clutch pedal effort is reduced.

At the time of release operation when the clutch pedel is stepped on, the release bearing 26 is moved backward by the release lever 27 and the sleeve 24 is caused to slide in conjunction with the release bearing 26. As the sleeve 24 slides, the retainer 32 held in position by the snap ring 32a is pulled backward against the spring force P of the cone spring 42, whereupon the cone spring 42 is brought to condition R in FIG. 1. Then, the inner-side fulcrum 62 of lever 60 is shifted backward through pivotal movement of the lever 60 at its outer-side fulcrum 64, and accordingly the intermediate fulcrum 66 is also shifted backward. Thus, the pressure plate 18 is moved backward under the spring force of the strap plate 74, the clutch discs 12, 16 being thereby released from the state of being pressed.

(Other Embodiment)

This invention is not limited to the above described embodiment. In another embodiment, for example, the protrusion 38 of the retainer 32 is extended to form a protrusion 38a having an abutment portion 34a adapted to be held in pressure contact with the inner-side periphery of the cone spring 42b.

(Effect of the Invention)

In the clutch according to the invention, as above described, the cone spring 42 is supported by the protrusion 44 of the clutch cover 20. When compared with the prior-art arrangement shown in FIG. 5, therefore, the clutch of the invention does not require any such elements as wire ring 112 and stud pin 114, whereby a reduction in the number of parts has been achieved.

Furthermore, in the case of replacing the cone spring 42, the arrangement of the invention requires no such operation as first removing the stud pins 114 and fitting them again in position, which operation is necessary with the FIG. 5 arrangement. The cone spring 42 is easy to dismantle and no special tool is required for this purpose. The clutch according to the invention permits easy replacement work.

What is claimed is:

1. A pull release clutch released by pulling a release bearing away from a flywheel by means of a release lever connected to a clutch pedal, comprising clutch discs splinedly fitted on an input shaft of a speed change gear, a sleeve fitted over the outer periphery of said input shaft, said release bearing being fixed to said sleeve at the sleeve end nearer to said speed change gear, a retainer fitted on said sleeve at the sleeve end nearer to said flywheel, said retainer being stopped against dislocation from said sleeve, a pressure plate connected to said flywheel for pressing said clutch discs against said flywheel, a clutch cover covering said pressure plate, a generally disc-shaped spring member between said clutch cover and said retainer, the outer circumferential edge portion of said spring member being held in position by a holder portion on the inner periphery of said clutch cover, an inner peripheral portion of said spring member being pressed against said retainer at a side of said retainer facing said speed change gear, levers disposed between said retainer and said pressure plate, said levers each being supported at a radially inner side fulcrum thereof by said retainer and biased at a radially outer side fulcrum thereof toward said clutch cover, said levers each being biased at an intermediate fulcrum thereof against said pressure plate, so that the load of said spring member acting on said retainer is magnified for transmission at a specified lever ratio between said individual fulcrums of each of said levers.

2. A clutch as set forth in claim 1, wherein said spring member is a cone spring and said holder portion for holding said circumferential edge portion of said cone spring is a generally annular protrusion formed on clutch cover, said circumferential edge portion of said cone spring being held in engagement with said protrusions.

3. A clutch as set forth in any one of claim 1 or 2, wherein the lever ratio L1:L2 between the distance L1 between said outer-side and inner-side fulcrums of said lever and the distance L2 between said outer-side and intermediate fulcrums is set at approximately 3:1.

4. A clutch as set forth in any one of claim 1 or 2, wherein there is provided an adjuster ring which is in thread engagement with said outer-side end of said lever being pressed against said adjuster ring.

5. A clutch as set forth in claim 3, wherein there is provided an adjuster ring which is in thread engagement with said clutch cover so that its movement is axially adjustable, the outer-side end of said lever being pressed against said adjuster ring.

* * * * *